United States Patent
Chowdhury et al.

(10) Patent No.: US 9,166,809 B2
(45) Date of Patent: Oct. 20, 2015

(54) AUTOMATED NETWORK TESTING

(75) Inventors: Shafqat Chowdhury, Gaithersburg, MD (US); Adam Barrow, Roanoke, TX (US); Krishna Kodakkattil, Flower Mound, TX (US); John Sanchez, Flower Mound, TX (US); Jennifer Babu, Purcellville, VA (US); Benyam Chekol, Herndon, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1828 days.

(21) Appl. No.: 11/691,757

(22) Filed: Mar. 27, 2007

(65) Prior Publication Data

US 2007/0263546 A1    Nov. 15, 2007

Related U.S. Application Data

(60) Provisional application No. 60/788,761, filed on Apr. 3, 2006, provisional application No. 60/788,858, filed on Apr. 3, 2006.

(51) Int. Cl.
*H04L 12/26* (2006.01)
*G06F 11/36* (2006.01)
*H04L 12/24* (2006.01)

(52) U.S. Cl.
CPC ............ *H04L 12/2697* (2013.01); *H04L 43/50* (2013.01); *G06F 11/3688* (2013.01); *H04L 41/22* (2013.01)

(58) Field of Classification Search
None
See application file for complete search history.

(56) References Cited

U.S. PATENT DOCUMENTS

| | | | | |
|---|---|---|---|---|
| 5,850,511 A * | 12/1998 | Stoecker et al. | ............. | 714/38.1 |
| 5,892,947 A * | 4/1999 | DeLong et al. | ............. | 717/100 |
| 5,907,696 A * | 5/1999 | Stilwell et al. | .................. | 703/13 |
| 5,910,895 A * | 6/1999 | Proskauer et al. | ............ | 700/121 |
| 5,982,753 A * | 11/1999 | Pendleton et al. | ............ | 370/252 |
| 6,243,832 B1 * | 6/2001 | Eckes et al. | ..................... | 714/33 |
| 6,338,148 B1 * | 1/2002 | Gillenwater et al. | ........... | 714/25 |
| 6,456,306 B1 * | 9/2002 | Chin et al. | ..................... | 715/810 |
| 6,510,402 B1 * | 1/2003 | Logan et al. | .................. | 702/186 |
| 6,542,928 B1 * | 4/2003 | Hammons | ..................... | 709/221 |
| 6,601,018 B1 * | 7/2003 | Logan | ........................... | 702/186 |
| 6,615,153 B2 * | 9/2003 | Liu et al. | ....................... | 702/121 |
| 6,628,619 B1 * | 9/2003 | Giles et al. | .................... | 370/248 |
| 6,654,911 B1 * | 11/2003 | Miles | ............................ | 714/38.13 |
| 6,715,103 B1 * | 3/2004 | Nagai | ............................ | 714/25 |
| 6,775,824 B1 * | 8/2004 | Osborne et al. | ............... | 717/125 |
| 6,792,460 B2 * | 9/2004 | Oulu et al. | ..................... | 709/224 |
| 6,804,709 B2 * | 10/2004 | Manjure et al. | ............... | 709/220 |
| 6,853,943 B1 * | 2/2005 | Neumann et al. | ............. | 702/122 |
| 6,889,339 B1 * | 5/2005 | D'Amico et al. | ............. | 714/4.4 |
| 6,915,343 B1 * | 7/2005 | Brewer et al. | ................. | 709/224 |

(Continued)

OTHER PUBLICATIONS

TestLink Documentation. Mar. 6, 2005. available at <https://web.archive.org/web/20050306181729/http://testlink.sourceforge.net/docs/docs/print.php?page=all>.*

(Continued)

*Primary Examiner* — Matthew Brophy (57) ABSTRACT

A test case management subsystem includes a data store, the data store including data relating to a network device. A network testing subsystem is configured to receive an instruction from said test case management subsystem, wherein the instruction includes the data relating to the network device, and execute an automated command line to test the network device.

20 Claims, 3 Drawing Sheets

(56) References Cited

U.S. PATENT DOCUMENTS

| | | | |
|---|---|---|---|
| 7,010,782 B2 * | 3/2006 | Narayan et al. | 717/124 |
| 7,117,411 B2 * | 10/2006 | McNeely et al. | 714/724 |
| 7,165,189 B1 * | 1/2007 | Lakkapragada et al. | 714/31 |
| 7,194,535 B2 * | 3/2007 | Hannel et al. | 709/224 |
| 7,231,187 B2 * | 6/2007 | Adams et al. | 455/67.11 |
| 7,444,397 B2 * | 10/2008 | Linville et al. | 709/223 |
| 7,496,815 B2 * | 2/2009 | Bhaumik et al. | 714/724 |
| 7,702,764 B1 * | 4/2010 | Tannous | 709/223 |
| 2001/0012986 A1 * | 8/2001 | Conan et al. | 702/188 |
| 2002/0116507 A1 * | 8/2002 | Manjure et al. | 709/229 |
| 2002/0162059 A1 * | 10/2002 | McNeely et al. | 714/703 |
| 2003/0018699 A1 * | 1/2003 | Matthews et al. | 709/201 |
| 2003/0131085 A1 * | 7/2003 | Zhang et al. | 709/223 |
| 2003/0191590 A1 * | 10/2003 | Narayan et al. | 702/68 |
| 2004/0117759 A1 * | 6/2004 | Rippert et al. | 717/100 |
| 2004/0205406 A1 * | 10/2004 | Kaliappan et al. | 714/31 |
| 2005/0166094 A1 * | 7/2005 | Blackwell et al. | 714/38 |
| 2005/0234845 A1 * | 10/2005 | Okunseinde et al. | 707/1 |
| 2006/0174170 A1 * | 8/2006 | Garland et al. | 714/57 |
| 2006/0253588 A1 * | 11/2006 | Gao et al. | 709/226 |
| 2007/0129976 A1 * | 6/2007 | Hochberg et al. | 705/7 |
| 2007/0234293 A1 * | 10/2007 | Noller et al. | 717/124 |
| 2007/0266165 A1 * | 11/2007 | Li | 709/230 |

OTHER PUBLICATIONS

Testlink Documentation. as of Mar. 6, 2005. available at <https://web.archive.org/web/20050306181729/http://testlink.sourceforge.net/docs/docs/print.php?page=all>.*

"Appendix A, TestSmart User Guide", Sapphire InfoTech, Fremont, CA, copyright 2000.

"MQC-TestSmart User Guide" Sapphire InfoTech, Fremont, CA, copyright 2006.

"Mercury Quality Center User's Guide", Mercury Interactive Corporation, Mountain View, CA, copyright 2004-2005.

* cited by examiner

AUTOMATED NETWORK TESTING

This application claims priority to provisional U.S. patent application No. 60/788,761, entitled "SYSTEMS AND METHODS FOR NETWORK TESTING," and No. 60/788,858, also entitled "SYSTEMS AND METHODS FOR NETWORK TESTING," both filed Apr. 3, 2006, and both fully incorporated herein by reference in their entireties.

BACKGROUND INFORMATION

While existing network testing technologies may be suitable for testing certain networks, they are often inadequate for testing diverse networks that employ different platforms and/or communication protocols and data formats. For example, off-the-shelf network testing products are typically designed for testing only certain types of network platforms, but lack the tools for testing other network platforms.

Existing network testing technologies usually have other shortcomings as well. For example, some network testing technologies require significant manual input from a user. By way of another example, certain network testing technologies have unfamiliar user interfaces that require users to learn new skill sets when such network testing technologies are adopted. Moreover, many existing network testing technologies are vendor specific, and full integration of vendor specific network testing products is not trivial. Accordingly, with present network testing technologies it is often difficult to facilitate the creation, storage, and retrieval of test steps and test cases, as well as equipment configuration information, across diverse testing tools. It is further often difficult to prevent users from using a first tool to alter and possibly corrupt data created by a second tool when such data is stored in more accessible to the first tool.

DETAILED DESCRIPTION OF PREFERRED EMBODIMENTS

Figure 1:
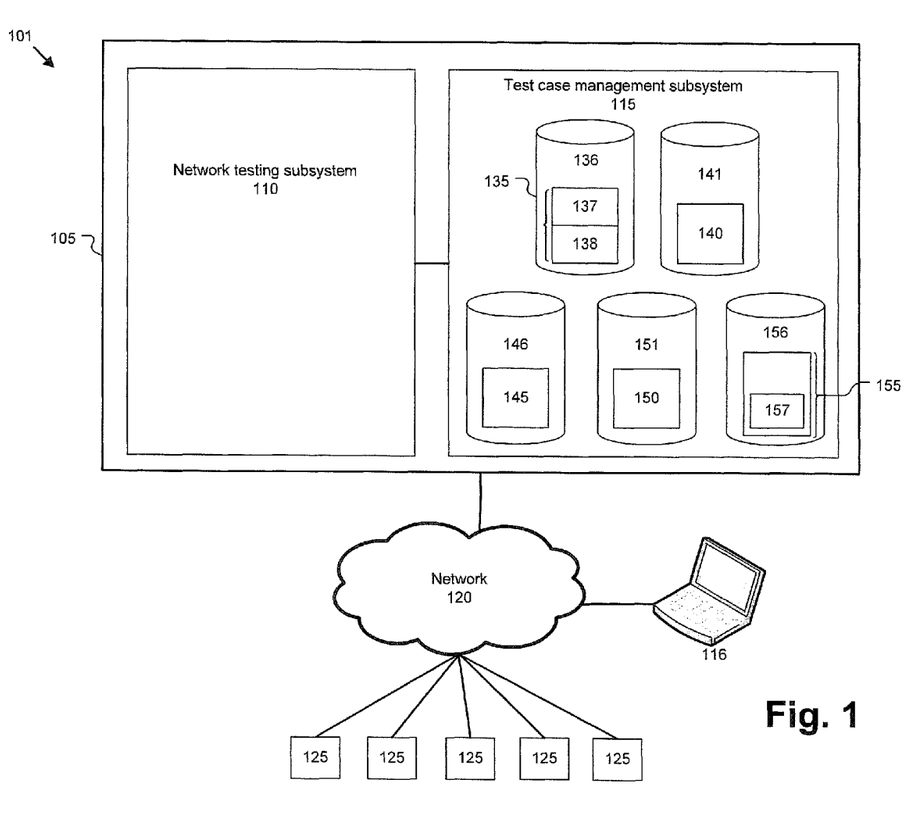
FIG. 1 illustrates an exemplary test environment for testing networks and/or network devices.

FIG. 1 illustrates an exemplary test environment 101 for testing networks 120 and/or network devices 125. Test environment 101 includes test application 105, which in turn includes network testing subsystem 110 and test case management subsystem 115. Test application 105 generally includes computer-executable program instructions implemented on one or more computing devices. In particular, it is to be understood that network testing subsystem 110 in test case management subsystem 115 may be located on a single computing device, may each be located on a different computing device, or that each of network testing subsystem 110 or test case management subsystem 115 may be implemented on more than one computing device. For example, network testing subsystem 110 may be installed on one or more client computers 116, while test case management subsystem 115 may be installed on a central server (not illustrated in FIG. 1), and may simply provide a graphical user interface (GUI) in the form of a web page or the like that may be viewed in a display of a client computer 116.

In any event, it is possible to efficiently manage network testing operations, including creating, storing, running, and tracking automated test cases. The test cases may be designed to measure and/or test network 120 parameters such as are generally known. Accordingly, it is possible to measure parameters of a wide variety of different types of communication networks, and a network 120 may include, but is not limited to, one or more of the following kinds of networks: wireless networks, cellular telephone networks, broadcast media networks, cable networks, satellite networks, television networks, Internet protocol based ("IP-based") networks, Voice over Internet Protocol (VoIP) networks, Public Switched Telephone Networks (PSTNs), the Internet, private networks, Local Area Networks (LANs), Wide Area Networks (WANs), pico-networks, and other networks.

Network devices 125 may include but are not limited to, telephony switches, network infrastructure devices, traffic generating devices and other third party test equipment.

Network testing subsystem may include one or more extensions to a previously existing test application 105. Exemplary extensions include, but are not limited to, one or more of the following: data fields and other functions useful for integrating the application with a test case management subsystem, functionality for updating the application through a network connection (e.g., web updates), and functionality for hosting the enhanced network testing application 105 on one or more servers. The extensions may also include support for one or more of the following: access control list functionality, license management, Secure Shell ("SSH") version 1 and 2 functionality, Telnet functionality, Transaction Language One ("TL1") functionality, American National Standards Institute ("ANSI") terminal type connections, and Video Terminal 100 ("VT100") terminal type connections. Other extensions enable the network testing subsystem to function correctly even when there is no terminal negotiation supported by the network device 125 under test.

Further, certain extensions enable the integration of a testing application 105 with one or more other applications. This allows functionality of different network testing applications 105 to be combined in ways that enhance both user friendliness for managing testing and the automation of test functions and data collection.

For example, by integrating network testing subsystem 110 with the test case management subsystem 115, environment 101 has both broad functionality and full test automation. For example, the test case management subsystem 115 provides user tools for creating and initiating test cases. The network testing subsystem 110 can be launched by the test case management subsystem 115 sending an instruction that is received by the network testing subsystem 110. When launched, the network testing subsystem 110 runs automated command lines, i.e., automated test scripts, associated with the test cases to test one or more network devices 125 and captures data resulting from the tests scripts being run. The network testing subsystem 110 reports the results to the test case management subsystem 115 for analysis and/or presentation to a user. The test case management subsystem 115 may be configured to store the results, e.g., test results 145 in data store 146. Accordingly, a user is able to access and control fully automated test scripts through a user interface, e.g., a web interface, provided by the test case management subsystem 115. Test scripts may thereby be executed, and data captured and reported, automatically without requiring a user to invoke manually the network testing subsystem or to transfer manually results from the network testing subsystem 110 to the test case management subsystem 115.

Network testing subsystem 110 may connect to devices 125 using a Telnet session or the secure shell (SSH) protocol, including version 1 or 2. SSH may provide the same set of features that is available for Telnet connections; however, SSH may be used for secure communications, and Telnet may be used for general communications. Certain devices 125 require SSH communications. Further, network testing subsystem 110 may support for ANSI terminal type connections, including compatibility with any ANSI specified features. This allows test application 105 to test network devices 125 that use ANSI terminal type connections. In addition, network testing subsystem 110 may support VT100 terminal type connections, including compatibility with any ANSI specified features. This allows test application 105 to test network devices 125 that use VT100 terminal type connections. Moreover, network testing subsystem 110 may include support for TL1 signals in accordance with known specifications from Telcordia Technologies, Inc., of Piscataway, N.J. Network testing subsystem 110 may thereby support valid TL1 commands and responses. Accordingly, test application 105 may test network devices that use TL1-based communications in an automated manner, including devices that use standard telecommunication commands to communicate.

In an exemplary embodiment, network testing subsystem 110 includes a TestSmart™ application provided by Sapphire Infotech of Fremont, Calif., as well as one or more of the extensions described herein as applied to the TestSmart™ application. For example, at least one extension to the TestSmart™ application may integrate it with test case management subsystem 115. In an exemplary embodiment, the test case management 115 subsystem includes Mercury Quality Center™ ("MQC") provided by Mercury™ of Mountain View, Calif. The resulting application 105, which includes the network testing subsystem 110 configured to operate with the test case management subsystem 115, may include any of the functions provided by the TestSmart™ application, the extensions described herein, and the MQC, including any of the functions described in the TestSmart™ User Guide, Version 2.0 (2000) published by Sapphire Infotech of Fremont, Calif. and/or in the Mercury Quality Center™ User's Guide, Version 8.2 Service Pack 1 (2005) published by Mercury™. The contents of both of these publications are hereby incorporated by reference in their entireties.

Test case management subsystem 115 may store information such as test items 157, test cases 135, permissions 140, test results 145, application patches 150, and test metadata 155 in one or more data stores 136, 141, 146, 151, and 156.

Test cases 135 are generally constructed by users through a GUI provided by test case management subsystem 115, and generally include one or more steps for testing devices 125 and for receiving and storing data resulting from such tests. Test cases 135 may include user steps 137 and/or execution steps 138, and are generally stored in test cases data store 136.

A user step 137 is a step in a test case 135 that may be undertaken by a user, e.g., sending a message, providing input to a device 125, etc. User steps 137 are generally created by a user, and in any event may be displayed, e.g., in a GUI in client 1116, and generally may be edited, according to permissions 140, by the user.

An execution step 138 is a step in a test case 135 that is required as part of or because of a user step 137, even though the execution step 138 would not be apparent to the user. Execution steps 138 are generally not displayed to users, and generally may not be edited by users. Execution steps 138 generally access metadata 155, including test items 157, described further below, which metadata 155 is not accessible by users.

As described below with reference to FIG. 4, execution steps 138 may be generated from user steps 137 by network testing subsystem 110, and a user is generally not aware of execution steps 138. For example, a user might attempt to send a message through a device 125, which attempt might be represented in a user step 137. However, the user step 137 might in turn require one or more execution steps 138, e.g., to configure the device 125, determine whether the device 125 is present on network 120, send instructions to the device 125, receive a response to instructions sent to the device 125, etc.

Permissions 140 are generally associated with test items 157, and indicate a level of access provided to a user for a test at 157. For example, a user may be provided with a "view" level of access that allows a user to view a record, e.g., a test item 157. An "edit" level of access allows a user to edit a record, e.g., a test item 157. A "design" level of access permits a user to include a test item 157 in a test case 135. A "run" level of access permits a user to execute test cases 135 or tests making use of a test item 157 with respect to which the user has been given the design level of access. Permissions 140 are generally stored in permissions data store 141.

Test results 145 include data received by test case management subsystem 115, sometimes via network testing subsystem 110, concerning a test or tests conducted as provided for in a test case 135. Examples of such data include responses of devices 125 to particular commands, information concerning whether a device 125 was able to respond to a particular command, information concerning the amount of time taken for a device 125 to respond to a particular command, etc. Test results 145 are generally stored in test results data store 146.

Storage of test results 145 from network testing subsystem 110 allows for mapping and reporting of data from tests conducted by network testing subsystem 110 automatically and without human intervention. Accordingly, data fields data store 146 may be automatically populated with data from network testing subsystem 110. Therefore, it is possible to provide output, e.g., description and expected results data, from the network testing subsystem 110 that is mapped to fields in test results data store 146 included in test case management subsystem 115. For example, defect data related to network devices 125 should map to defect fields in data store 146, and status data (e.g., pass or fail) related to devices 125 should map to pass/fail fields in data store 146. Accordingly, it is generally not necessary to manually transfer data from network testing subsystem 110 to test case management subsystem 115.

Application patches 150 include application updates, patches, and the like for network testing subsystem 110. Accordingly, application updates, patches, and the like may be easily deployed to client devices of the network testing subsystem 110 from a centralized server such as a server hosting test case management subsystem 115. The patches may be downloaded automatically when users access network testing subsystem 110. Application patches 150 are generally stored in application patches data store 151.

Test metadata 155 refers to information that is specific to network testing subsystem 110 but is stored in a data store 156 included in test case management subsystem 115. Information for populating test metadata 155 may be provided by an administrator of system 100 or test application 105 or the like. Test items 157 may be included in metadata 155. Test items 157 include records representing items that may be referenced in a test case 135. For example, test items 157 may include information about network devices 125, such as information for configuring a network device 125. Test items 157 may also include templates for requests that may be sent to a device 125 in a command line, network addresses for a device 125, etc.

Test metadata 155 is generally accessible only to program elements of test application 105, e.g., network testing subsystem 110 and test case management subsystem 115. Test metadata 155 is generally not accessible to users. Accordingly, storage of metadata 155 related to network testing subsystem 110 in data store 156 included in test case management subsystem 115 advantageously prevents a user from accidentally or improperly editing or deleting metadata 155. Further, test metadata 155 may be segregated from other data stored or maintained in test case management subsystem 115 to avoid cluttering or confusing reports, GUIs, and the like in test case management subsystem 115 with metadata 155 that pertains only to network testing subsystem 110. Accordingly, a GUI provided in test case management subsystem 115 may be devoid of folders and tests that are used to stored metadata 155 pertaining to network testing subsystem 110. Storing metadata 155 pertaining to network testing subsystem 110 in data store 156 included in test case management subsystem 115 enhances the integration of network testing subsystem 110 and test case management subsystem 115 in test application 105.

Computing devices such as those used for test application 105, including network testing subsystem 110 and test case management subsystem 115, generally include instructions executable by the computing device and stored on a computer-readable medium included within or connected to the computing device. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Data stores included within included within test application 105, such as data stores 136, 141, 146, 151, and 156 may include relational database software such as is generally known. Relational database software generally refers to a relational database management system (RDBMS), as is known. An RDBMS generally employs the known Structured Query Language (SQL). However, it is to be understood that data stores included within test application 105 may be some other kind of database such as a hierarchical database, a set of files, an application database in a proprietary format, etc. Further, it is to be understood that data stores 136, 141, 146, 151, and 156 are discussed herein as separate data stores for purposes of convenience and clarity, but that data stores 136, 141, 146, 151, and 156 may all be included in a single database or in one or more separate databases.

Figure 2:
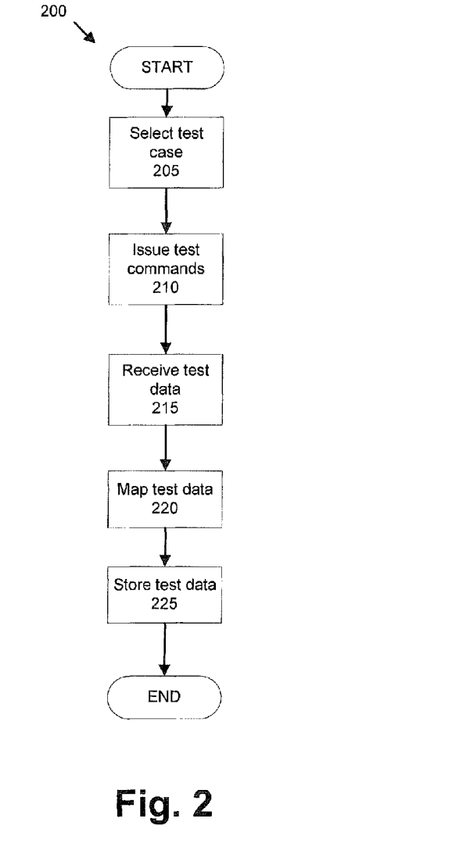
FIG. 2 illustrates an exemplary process for using a test application to test one or more network devices.

FIG. 2 illustrates an exemplary process 200 for using test application 105 to test one or more network devices 125.

In step 205, a test case for testing a network device 125 stored in test case management subsystem 115 is selected, e.g., by a user accessing a graphical user interface (GUI) in test case management subsystem 115, which then retrieves the selected test case 135 from test case data store 136.

Next, in step 210, test application 105 issues commands to one or more network devices 125 via network 120, according to execution steps 138 in the test case 135 selected in step 205. For example, test case management subsystem 115 may invoke a script that includes a set of command lines to network testing subsystem 110 directing network testing subsystem 110 to issue one or more commands to one or more network devices 125. Accordingly, test case management subsystem 115 automates command line testing provided by network testing subsystem 1110.

Next, in step 215, network testing subsystem 110 receives data from network 120 and/or network devices 125 in response to commands issued in step 210 as described above.

Next, in step 220, network testing subsystem 110 provides data received in step 215 to test case management subsystem 115, which in turn maps the data to fields in test results data store 146. Such mapping may be accomplished by reference to a map table or the like that may be stored in data store 146, providing associations mapping fields as reported by network testing subsystem 110 to test case management subsystem 115.

Next, in step 225, test case management subsystem 115 stores data received in step 215, e.g., test results data store 146, according to the mapping performed in step 220.

Following step 225, process 200 ends.

Figure 3:
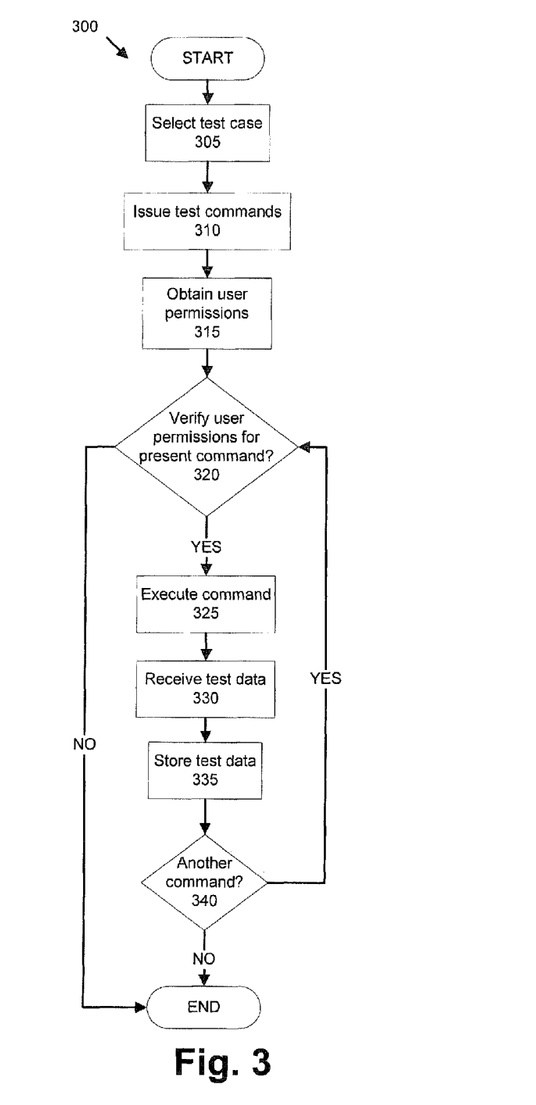
FIG. 3 illustrates an exemplary process for using a test application to test one or more network devices according to permissions.

FIG. 3 illustrates an exemplary process 300 for using test application 105 to test one or more network devices 125 according to permissions 140. It will be noted that, although additional steps are described, process 300 is similar in many respects to process 200.

Step 305 is substantially similar to step 205 discussed above with reference to process 200.

Next, in step 310, test case management subsystem 115 issues one or more commands for network testing to network testing subsystem 110, e.g., by invoking a script that includes a set of command lines to network testing subsystem 110 directing network testing subsystem 110 to issue one or more commands to one or more network devices 125. Such command or script is generally issued on behalf of a particular user, the user being identified by test case management subsystem 115 to network testing subsystem 110 according to a user identifier or the like.

Next, in step 315, network testing subsystem 110, according to the user identified in step 310, obtains a set of permissions 140, each pertaining to one of the commands issued in step 310.

Next, in step 320, network testing subsystem 110 determines whether the user identified in step 310 has a permission 140 sufficient to execute the pending command, i.e., the next one of the commands issued in step 310, e.g., if step 320 is being visited for the first time, the pending command is the first command issued in a set of commands or script provided in step 310. For example, the pending command may direct a request for instruction to be sent to a network device 125. The network device 125 may be referenced in a test item 157, as discussed above. However, the user identified in step 310 may lack a permission 142 run tests associated with this test item 135. If a user is determined to lack sufficient permission 140 to execute the pending command, process 300 ends. However, if a user is determined to have sufficient permission 140 to execute the pending command, step 325 is executed next.

In step 325, the pending command is executed. For example, a request or instruction that may result in a response such as taking an action or providing data may be sent to a network device 125.

It should be understood that step 320 may be executed after rather than before step 325. For example, a user may have permissions 140 for many test items 135. Some of these test items 135 may not be associated with a command provided in step 310. Accordingly, it may be desirable for network testing subsystem 110 to determine only permissions 140 associated with commands provided in step 310.

Following step 325, in step 330, which is similar to step 215 in process 200, network testing subsystem 110 receives data from network 120 and/or network device 125 resulting from execution of the pending command as described above with respect to step 325.

Next, in step 335, network testing subsystem 110 stores data received in step 330, e.g., in test results data store 145.

Next, in step 340, network testing subsystem 110 determines whether another command remains in the set of commands provided in step 310. If so, process 300 returns to step 320. Otherwise, process 300 ends.

Figure 4:
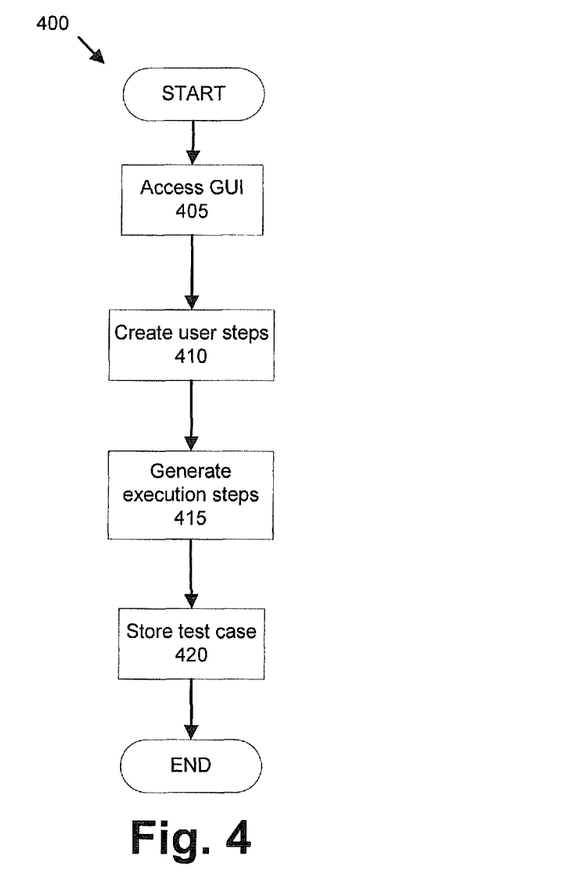
FIG. 4 illustrates an exemplary process for creating a test case 135.

FIG. 4 illustrates an exemplary process for creating a test case 135.

In step 405, a user, e.g., of client 116 accesses a graphical user interface (GUI) in network testing subsystem 110 that allows the user to provide inputs for creating a test case 135. For example, using this GUI, a user may indicate user steps 137 to be taken with respect to one or more test items 157.

Accordingly, next, in step 410, a user indicates through the GUI accessed in step 405 user steps 137 to be included in a test case 135, generally including an order for such user steps 137.

Next, in step 415, network testing subsystem 110 generates execution steps 138. Network testing subsystem 110 generally includes program instructions for analyzing the user steps 137 specified in step 410. According to such analysis, network testing subsystem 110 generally further includes program instructions for generating execution steps 138. For example, a user step 137 to send a message to a network device 125 may require execution steps 138 to format the message, transmit the message, and wait for confirmation that the message was received. Further, a user step 137 may require configuration and setup of a network device 125 that may be accomplished by one or more execution steps 138.

A result of steps 410 and 415 is generally a test case 135 that includes both user steps 137 and execution steps 138. User steps 137 may be displayed or viewed by a user of network testing subsystem 110 and/or test case management subsystem 115, while execution steps 138 are executed by network testing subsystem 110 when the test case 135 is invoked.

Next, in step 420, the test case 135 created in steps 410 and 415 is stored in test case management subsystem 115, e.g., in test case data store 136.

Following step 420, process 400 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising:
   one or more processors containing in combination a test case management subsystem and a network testing subsystem, the test case management subsystem configured to invoke a script that includes a set of command lines;
   a data store included within the test case management subsystem, the data store including a test item comprising data relating to a network device, wherein the data relating to a network device are for configuring the network device, wherein at least some of the data in the data store is inaccessible to users of the test case management subsystem;
   an additional data store included in the test case management subsystem, the additional data store including at least one permission associated with the test item, wherein the at least one permission indicates a level of access provided to a user of the test case management subsystem;
   the network testing subsystem comprising a testing application for testing the network device based on the configuration data in the data store, the network testing subsystem configured to:
   integrate the testing application with the network subsystem by using an extension to the testing application that includes integration functions and data fields used to integrate data from the test case management subsystem into the network testing subsystem;

receive an instruction from said test case management subsystem, via the extension to the testing application, in response to the test case management subsystem invoking the script that includes the set of command lines to direct the network testing subsystem to issue an automated command line, wherein the instruction includes the data relating to the network device;

determine whether the at least one permission associated with the test item is sufficient to execute the automated command line;

if the permission is sufficient, execute the automated command line to test the network device;

capture test results; and provide the test results to the test case management subsystem, wherein fields in the test results map to fields in a second data store in the test case management subsystem.

2. The system of claim 1, wherein the test case management subsystem is configured to store the test results in the second data store.

3. The system of claim 1, further comprising a network that connects at least the network device and the network testing subsystem.

4. The system of claim 1, further comprising a graphical user interface provided by the test case management subsystem.

5. The system of claim 4, further comprising a client device that displays the graphical user interface, wherein the test case management subsystem and the network testing subsystem are provided on one or more server devices.

6. The system of claim 4, wherein the graphical user interface provides at least one of a mechanism for inputting information relating to a network device and a mechanism for inputting an instruction.

7. The system of claim 6, further comprising a test case included in a third data store included in the test case management subsystem, wherein the test case includes the instruction.

8. The system of claim 7, wherein the network testing subsystem is further configured to generate the instruction according to the data stored in the data store.

9. A method, comprising:

storing a test item data relating to a network device in a data store included in a test case management subsystem, wherein data relating to a network device are for configuring the network device and wherein at least some of the data in the data store is inaccessible to users of the test case management subsystem;

storing at least one permission associated with the test item, wherein the at least one permission indicates a level of access provided to a user of the test case management subsystem;

sending, from the test case management subsystem to a network testing subsystem, an instruction, via an extension to a testing application, that includes the data relating to the network device in response to the test case management subsystem invoking a script that includes a set of command lines to direct the network testing subsystem to issue an automated command line, wherein the network testing subsystem comprises the testing application that tests the network device based on configuration data in the data store, the network testing subsystem being configured to integrate the testing application with the network subsystem by using the extension to the testing application that includes integration functions and data fields used to integrate data from the test case management subsystem into the network testing subsystem;

determining whether the at least one permission associated with the test item is sufficient to execute the automated command line;

if the permission is sufficient, executing, in the network testing subsystem, the automated command line to test the network device;

capturing test results in the network testing subsystem; and providing the test results to the test case management subsystem, wherein fields in the test results map to fields in a second data store in the test case management subsystem.

10. The method of claim 9, further comprising storing the test results in the second data store.

11. The method of claim 9, further comprising using a network and connecting at least the network device and the network testing subsystem.

12. The method of claim 9, further comprising making at least some of the data in the data store inaccessible to users of the test case management subsystem.

13. The method of claim 9, further comprising displaying on a client device a graphical user interface, and providing the test case management subsystem and the network testing subsystem on one or more server devices.

14. The method of claim 9, further comprising providing a graphical user interface in the test case management subsystem that provides at least one of a mechanism for inputting information relating to a network device and a mechanism for inputting an instruction.

15. The method of claim 14, further comprising including a test case in a third data store included in the test case management subsystem, wherein the test case includes the instruction.

16. The method of claim 15, wherein the network testing subsystem is further configured for generating the instruction according to the data stored in the data store.

17. The method of claim 9, tangibly embodied as computer-executable instructions on one or more non-transitory computer-readable media.

18. A system, comprising:

one or more processors containing in combination a test case management subsystem and a network testing subsystem, the test case management subsystem configured to invoke a script that includes a set of command lines;

a first data store included within the test case management subsystem, the data store including at least a test item comprising data relating to a network device and a test case that includes an instruction, wherein data relating to a network device are for configuring the network device and wherein at least some of the data in the first data store is inaccessible to users of the test case management subsystem;

a second data store included within the test case management subsystem, wherein the test case management subsystem is configured to store test results in the second data store;

a third data store included within the test case management subsystem, wherein the third data store includes a test case that includes an instruction;

a fourth data store included in the test case management subsystem, the fourth data store including at least one permission associated with the test item, wherein the at least one permission indicates a level of access provided to a user of the test case management subsystem;

the network testing subsystem comprising a testing application for testing the network device based on the configuration data in the data store, the network testing subsystem configured to:
- integrate the testing application with the network subsystem by using an extension to the testing application that includes integration functions and data fields used to integrate data from the test case management subsystem into the network testing subsystem;
- receive the instruction from said test case management subsystem, via the extension to the testing application, in response to the test case management subsystem invoking a script that includes a set of command lines to direct the network testing subsystem to issue an automated command line, wherein the instruction includes the data relating to the network device;
- determine whether the at least one permission associated with the test item is sufficient to execute the automated command line;
- if the permission is sufficient, execute the automated command line to test the network device;
- capture the test results; and
- provide the test results to the test case management subsystem, wherein fields in the test results map to fields in a second data store in the test case management subsystem;

a graphical user interface provided by the test case management subsystem; and a client device that displays the graphical user interface, wherein the test case management subsystem and the network testing subsystem are provided on one or more server devices, wherein the graphical user interface provides at least one of a mechanism for inputting information relating to a network device and a mechanism for inputting an instruction.

19. The system of claim 18, wherein the network testing subsystem is further configured to generate the instruction according to data in at least one of the data stores.

20. The system of claim 18, further comprising a network that connects at least the network device and the network testing subsystem.

* * * * *